US009146559B2

(12) United States Patent
Kuss et al.

(10) Patent No.: US 9,146,559 B2
(45) Date of Patent: Sep. 29, 2015

(54) SYSTEM AND METHOD FOR GATHERING VIDEO DATA RELATED TO OPERATION OF AN AUTONOMOUS INDUSTRIAL VEHICLE (71) Applicant: The Raymond Corporation, Greene, NY (US)

(72) Inventors: Jeffrey J. Kuss, Binghamton, NY (US); Stephen L. Page, Greene, NY (US); Paul P. McCabe, Binghamton, NY (US); Timothy E. Donahue, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 93 days.

(21) Appl. No.: 13/796,346

(22) Filed: Mar. 12, 2013

(65) Prior Publication Data
US 2013/0190963 A1 Jul. 25, 2013

Related U.S. Application Data (63) Continuation-in-part of application No. 13/372,941, filed on Feb. 14, 2012.

(60) Provisional application No. 61/454,024, filed on Mar. 18, 2011.

(51) Int. Cl.
*G01C 22/00* (2006.01)
*G05D 1/00* (2006.01)
(Continued)

(52) U.S. Cl.
CPC .............. *G05D 1/021* (2013.01); *B60L 3/0015* (2013.01); *B66F 9/063* (2013.01); *G05D 1/0246* (2013.01); *G07C 5/008* (2013.01); *G07C 5/0866* (2013.01); *B60L 2200/42* (2013.01); *B60L 2240/622* (2013.01); *B60L 2260/32* (2013.01);
(Continued)

(58) Field of Classification Search
CPC . G05D 1/0246; G05D 1/0011; G05D 1/0278; G05D 1/027; G05D 2201/0211; G05D 1/0234; G05D 1/0214; G05D 1/028; G05D 1/024; Y02T 90/162; Y02T 90/16; B66F 9/063; B66F 17/003; B66F 9/0759
USPC ........... 701/23, 25, 2, 28, 24, 466, 494, 22, 1; 340/435, 426, 436, 438; 318/580, 582, 318/581, 640; 348/119, 159, 169, 580
See application file for complete search history.

(56) References Cited

U.S. PATENT DOCUMENTS

4,891,762 A * 1/1990 Chotiros ........................ 701/514
6,459,966 B2 * 10/2002 Nakano et al. .................. 701/23
(Continued)

*Primary Examiner* — Calvin Cheung
*Assistant Examiner* — Luis A Martinez Borrero
(74) *Attorney, Agent, or Firm* — Quarles & Brady LLP (57) ABSTRACT As an autonomously guided industrial vehicle travels through a facility images of the adjacent environment are acquired, by either a still camera or a video camera. An image file containing a plurality of the images is stored onboard the vehicle. During that travel, the location of the vehicle is determined. Upon occurrence of a predefined incident, such as encountering an obstacle or impacting an object, an incident message is transmitted wirelessly from the vehicle to a remote management computer. The incident message contains an indication of the type of incident, an indication of a location of the vehicle, and the plurality of images. The remote management computer responds to the incident message by providing a notification about the incident to one or more persons. The contents of the incident message enables the person notified to take corrective action.

18 Claims, 4 Drawing Sheets (51) Int. Cl.
*G05D 1/02* (2006.01)
*B66F 9/06* (2006.01)
*G07C 5/00* (2006.01)
*G07C 5/08* (2006.01)
*B60L 3/00* (2006.01)

(52) U.S. Cl.
CPC ..... *G05D2201/0216* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 7,660,650 B2 * | 2/2010 | Kawagoe et al. | 701/23 |
| 7,693,514 B2 * | 4/2010 | Sakagami et al. | 455/420 |
| 7,769,491 B2 * | 8/2010 | Fukuchi et al. | 700/253 |
| 7,953,526 B2 | 5/2011 | Durkos et al. | |
| 8,386,081 B2 * | 2/2013 | Landry et al. | 700/253 |
| 8,612,149 B2 * | 12/2013 | Walker et al. | 701/523 |
| 9,025,886 B2 * | 5/2015 | Holeva et al. | 382/202 |
| 2004/0013295 A1 * | 1/2004 | Sabe et al. | 382/153 |
| 2004/0062419 A1 * | 4/2004 | Roh et al. | 382/104 |
| 2004/0131231 A1 * | 7/2004 | Smilansky | 382/103 |
| 2005/0085947 A1 * | 4/2005 | Aldred et al. | 700/253 |
| 2005/0216121 A1 * | 9/2005 | Sawada et al. | 700/245 |
| 2006/0208169 A1 * | 9/2006 | Breed et al. | 250/221 |
| 2006/0212194 A1 * | 9/2006 | Breed | 701/29 |
| 2007/0038332 A1 * | 2/2007 | Ozaki et al. | 700/245 |
| 2007/0239324 A1 * | 10/2007 | Ehrman et al. | 701/2 |
| 2008/0071429 A1 * | 3/2008 | Kraimer et al. | 701/2 |
| 2008/0262669 A1 * | 10/2008 | Smid et al. | 701/23 |
| 2009/0074245 A1 * | 3/2009 | Smilansky | 382/103 |
| 2009/0099716 A1 * | 4/2009 | Roh et al. | 701/25 |
| 2009/0100063 A1 * | 4/2009 | Bengtsson et al. | 707/10 |
| 2009/0233631 A1 * | 9/2009 | Butler et al. | 455/466 |
| 2009/0257655 A1 * | 10/2009 | Melikian | 382/190 |
| 2010/0030379 A1 * | 2/2010 | Parlantzas et al. | 700/253 |
| 2010/0106344 A1 | 4/2010 | Edwards et al. | |
| 2011/0010023 A1 * | 1/2011 | Kunzig et al. | 701/2 |
| 2011/0118903 A1 * | 5/2011 | Kraimer et al. | 701/2 |
| 2011/0130905 A1 * | 6/2011 | Mayer | 701/22 |
| 2011/0137457 A1 * | 6/2011 | Zini et al. | 700/245 |
| 2011/0150348 A1 * | 6/2011 | Anderson | 382/224 |
| 2011/0166721 A1 * | 7/2011 | Castaneda et al. | 701/2 |
| 2011/0295424 A1 * | 12/2011 | Johnson et al. | 700/248 |
| 2011/0298939 A1 * | 12/2011 | Melikian | 348/222.1 |
| 2012/0123614 A1 * | 5/2012 | Laws et al. | 701/2 |
| 2012/0213444 A1 * | 8/2012 | Melikian | 382/204 |
| 2012/0239224 A1 * | 9/2012 | McCabe et al. | 701/2 |
| 2012/0239238 A1 | 9/2012 | Harvey et al. | |
| 2012/0245765 A1 * | 9/2012 | Medwin et al. | 701/2 |
| 2012/0310444 A1 * | 12/2012 | Fitch et al. | 701/2 |
| 2013/0096735 A1 * | 4/2013 | Byford et al. | 701/2 |
| 2013/0190963 A1 * | 7/2013 | Kuss et al. | 701/23 |
| 2015/0116498 A1 * | 4/2015 | Vartiainen et al. | 348/159 |

* cited by examiner

SYSTEM AND METHOD FOR GATHERING VIDEO DATA RELATED TO OPERATION OF AN AUTONOMOUS INDUSTRIAL VEHICLE

CROSS-REFERENCE TO RELATED PATENT APPLICATIONS

This application is a continuation in part of U.S. patent application Ser. No. 13/372,941 filed on Feb. 14, 2012 and which claimed benefit of U.S. provisional patent application No. 61/454,024 filed on Mar. 18, 2011.

STATEMENT CONCERNING FEDERALLY SPONSORED RESEARCH OR DEVELOPMENT

Not applicable.

BACKGROUND OF THE INVENTION

1. Field of the Invention

The present invention relates to industrial vehicles, such as material handling vehicles, and more particularly to operating autonomously guided industrial vehicles.

2. Description of the Related Art

Industrial vehicles of various types, including lift trucks, are used to move items at a facility such as a factory, a warehouse, a freight transfer station, or a retail store. Traditionally these vehicles were controlled by an on-board human operator. As industrial vehicles became more sophisticated, a new category of autonomous guided vehicles evolved. An autonomous guided vehicle (AGV) is a form of mobile robot, that without a human operator, transports goods and materials from one place to another in a constrained environment, such as a factory or a warehouse.

Some AGV's followed a wire buried in the floor and thus were limited to traveling along a fixed path defined by that wire. Guidance technology developed further so that the vehicle did not have to be confined to a fixed path. Here reference markers, referred to as fiducials, were placed at various positions in the facility. In one implementation, each fiducial had a unique appearance or an optically readable element, e.g., a unique barcode. An AGV that needed to travel to a certain location would determine a sequence of fiducials to that location and then travel from one fiducial to the next one in that sequence. An optical sensor on the AGV sensed adjacent fiducials as the vehicle travelled and the unique appearance or code of each fiducial enabled the vehicle to determine its present location and the travel direction along the desired sequence. Even more sophisticated navigation systems have been developed that employ a video camera and image recognition software to guide the AGV along a desired path that was previously learned by the navigation system.

Regardless of the particular navigation system that was used, an AGV often had difficulty when an obstacle blocked the desired path. For example, an employee might leave a pallet of goods in an aisle being travelled by the AGV. Sensors on the AGV detected the obstacle and the controller stopped the vehicle before striking the obstacle. The AGV, however, remained stopped as long as the obstacle blocked the desired path, as the navigation system lacked the intelligence to determine another path that avoided the obstacle. The vehicle remained stationary until an employee happened to notice the event and either removed the obstacle or manually guided the vehicle around the obstacle.

Thus it is desirable to provide a mechanism for handling incidents in which the AGV is unable to continue operating along an intended path.

SUMMARY OF THE INVENTION

A method operates an autonomously guided industrial vehicle that travels through a facility. During that travel, images of the portions of the facility adjacent to the industrial vehicle are acquired. Those images may be produced by a still camera or a video camera. An image file containing a plurality of the images is stored onboard the industrial vehicle.

Upon occurrence of a predefined incident, such as an unplanned stoppage of the vehicle, an incident message is transmitted wirelessly from the industrial vehicle to a remote management computer. That message contains one or more of the following types of information, a first indication of the type of incident, a second indication of a location of the industrial vehicle, and the plurality of the images acquired immediately prior to the incident. The remote management computer responds to the incident message by providing a notification about the incident to a person. In one embodiment of the present concept, the management computer sends the notification via email to the person.

DETAILED DESCRIPTION OF THE INVENTION

The present invention relates generally to operation of an industrial vehicle. Although the invention is being described in the context of a pallet truck used at a warehouse, the inventive concepts are applicable to other types of industrial vehicles, and their use in a variety of facilities, such as a factories, freight transfer stations, warehouses, and retail stores, for example.

Figure 1:
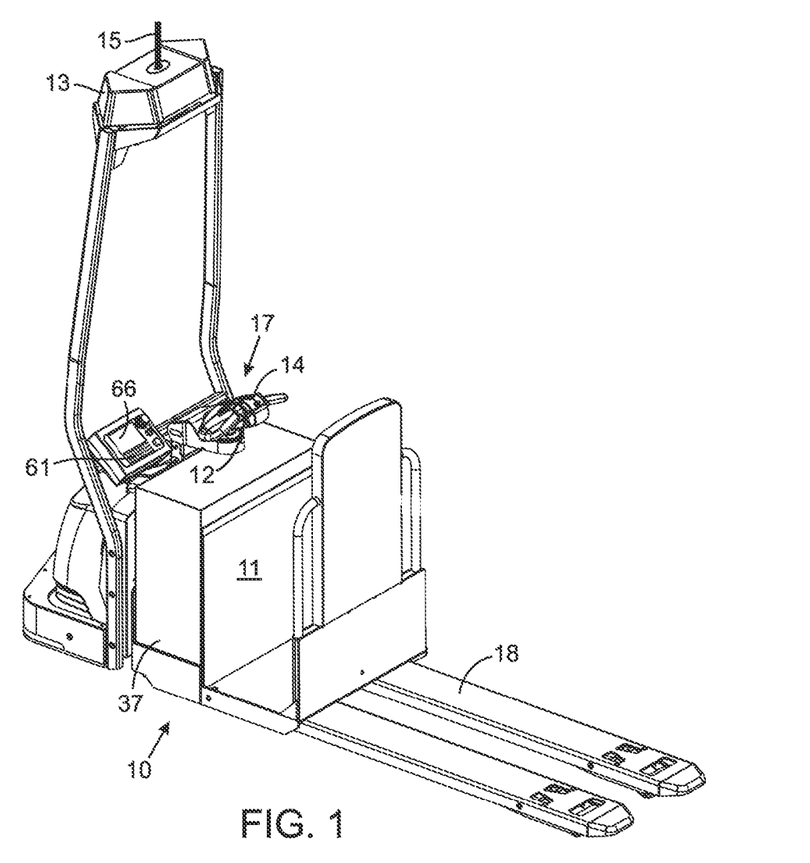
FIG. 1 is a perspective view of an industrial vehicle according to the present invention.

With initial reference to FIG. 1, an industrial vehicle 10, specifically a pallet truck, includes an operator compartment 11 with an opening for entry and exit by the operator. Associated with the operator compartment 11 is a control handle 14 that is one of several operator controls 17 and that has operator indicators 12. The industrial vehicle 10 has a load carrier 18, such as a pair of forks, that is raised and lowered with respect to the frame of the vehicle. As will be described in further detail, a communication system on the industrial vehicle is able to exchange data and commands via an antenna 15 and a wireless signal with an remotely located facility management system.

Industrial vehicle 10 further includes a Guidance And Navigation System (GANS) 13. Any commercially available guidance and navigation system may be used to determine a path for the industrial vehicle, sense environmental conditions outside the vehicle, and operate a propulsion drive system to guide the vehicle along the defined path. In one implementation, the GANS 13 determines the vehicle location and the travel path by sensing a buried wire, tape on the building floor, or magnetic markers adjacent the path. In another implementation, the GANS 13 employs a laser scanner or camera to sense fiducials placed on fixed objects throughout the facility that thereby define various paths. Thus upon each occasion that another fiducial is detected and new present location of the vehicle is determined by the GANS. In a further implementation, the GANS 13 has one or more video cameras that produce output images which are processed by image recognition software to detect the present location of the vehicle in the facility. A dead reckoning guidance technique also may be utilized. For systems using video cameras or dead reckoning guidance techniques, each industrial vehicle 10 is taught the different paths by manually driving the vehicle while the GANS 13 "learns" the path.

Thus the industrial vehicle 10 is a hybrid which can be controlled by a human operator who is on-board in the operator compartment 11 or which can be controlled in an unmanned, autonomous mode by the GANS 13.

Figure 2:
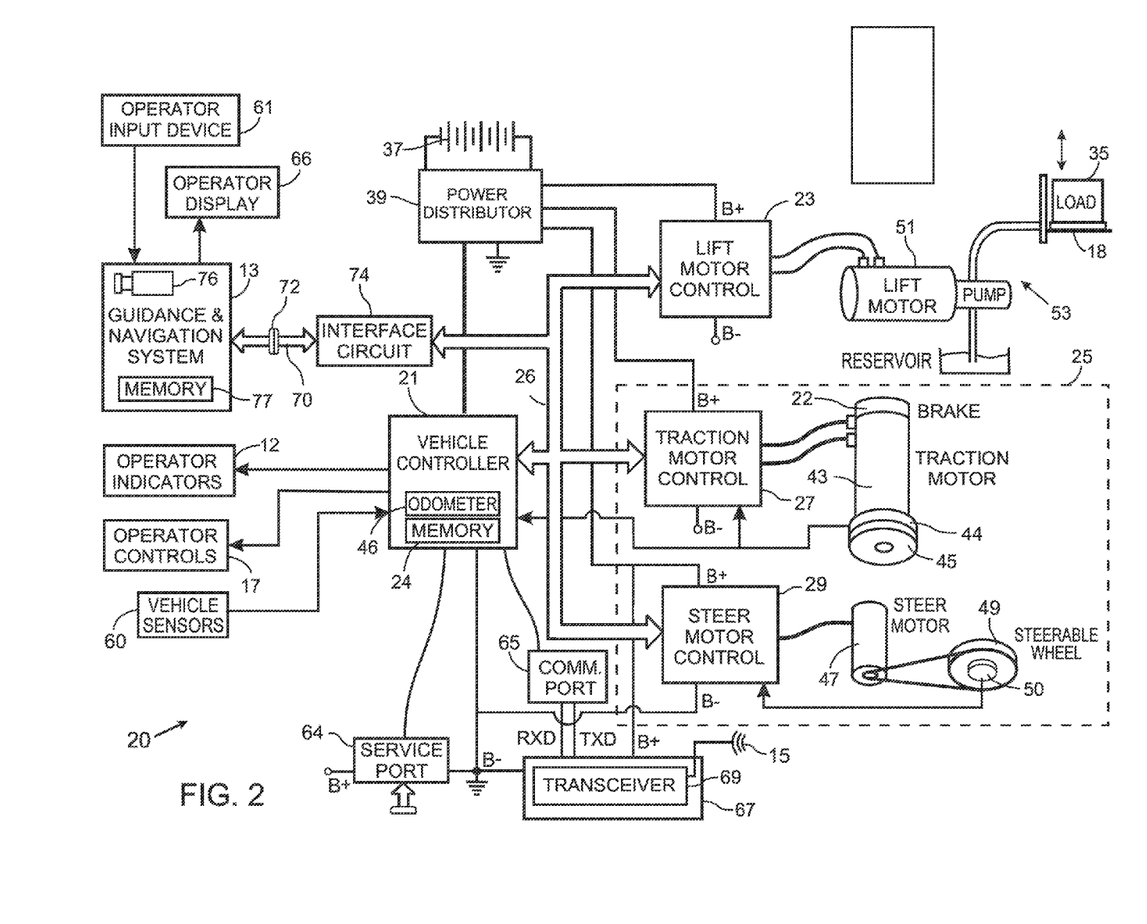
FIG. 2 is a block diagram of a control system for the industrial vehicle.

FIG. 2 is a block diagram of a control system 20 onboard the industrial vehicle 10. The control system 20 comprises a vehicle controller 21 which is a microcomputer based device that includes memory 24, analog to digital converters, and input/output circuits. The vehicle controller 21 executes a software program that responds to commands from either the operator controls 17 or the GANS 13 and operates vehicle components that propel the industrial vehicle and handle loads being transported. The operator controls 17 provide input signals to activate and govern operation of the vehicle functions, such as forward and backward travel, steering, braking, and raising and lowering the load carrier 18. In response to the operator input signals, the vehicle controller 21 sends command signals via a first communication network 26 to a lift motor control 23 and a propulsion drive system 25 comprising a traction motor control 27 and a steer motor control 29. The first communication network 26 may be any well-known network for exchanging commands and data among components of a machine, such as for example the Controller Area Network (CAN) serial bus that uses the communication protocol defined by ISO-11898 promulgated by the International Organization for Standardization in Geneva, Switzerland.

The industrial vehicle 10 is powered by a rechargeable energy source, such as a multiple cell battery 37, that is electrically coupled to the vehicle controller 21, propulsion drive system 25, steer motor control 29, and lift motor control 23 through a bank of fuses or circuit breakers in a power distributor 39.

The propulsion drive system 25 propels the industrial vehicle 10 in a desired direction along the floor of the facility. The traction motor control 27 drives at least one traction motor 43 that is connected to a propulsion wheel 45 to provide motive force for the industrial vehicle. The speed and rotational direction of the traction motor 43 and the associated propulsion wheel 45 are selected by the operator via a throttle control on the operator control handle 14, and are monitored by a feedback signal from a rotation sensor 44. The rotation sensor 44 can be an encoder coupled to the traction motor 43 and the signal therefrom is used to measure the speed and distance that the vehicle travels as recorded by an odometer 46. The propulsion wheel 45 is also connected to friction brake 22 through the traction motor 43, to provide both a service and parking brake functions for the industrial vehicle 10.

The steer motor control 29 is operably connected to drive a steer motor 47 and associated steerable wheel 49. The steering direction is selected by the operator by rotating the control handle 14, described above. The direction and amount of rotation of the steerable wheel 49 determines the direction that the industrial vehicle 10 travels. The steerable wheel 49 may be the same as the propulsion wheel 45 or it may be a different wheel. The turn angle sensor 50 can be coupled to the steerable wheel 49 to sense the angle at which that wheel is turned. The monitored turn angle is used by the vehicle controller 21 to perceive the direction that the vehicle is traveling.

The lift motor control 23 sends drive signals to control a lift motor 51 which is connected to a hydraulic circuit 53 that operates a lift assembly for raising and lowering the load carrier 18 and the load 35 being carried.

Referring still to FIG. 2, a plurality of data input and output devices are connected to the vehicle controller 21. Those devices include vehicle sensors 60 for parameters such as temperature, battery charge level, and object impact force. A maintenance service port 64, and a communication port 65 also are connected to the vehicle controller 21. The operator controls 17 allow the vehicle operator, a supervisor, or other personnel to enter data and configuration commands into the vehicle controller 21, and can be implemented as a keyboard, a series of discrete pushbuttons, a mouse, joystick or other input device as will be apparent to those of ordinary skill in the art. The maintenance service port 64 enables a technician to connect a portable computer (not shown) to the industrial vehicle 10 for diagnostic and configuration purposes. The communication port 65 is connected to a wireless communicator 67 that includes a radio transceiver 69 coupled to the antenna 15 for exchanging data and commands with a wireless communication system in the warehouse or factory in which the industrial vehicle 10 operates. Any one of several well-known serial communication protocols, such as Wi-Fi, can be used to exchange messages carrying commands and data via that bidirectional communication system. Each industrial vehicle 10 has a unique identifier, such as its manufacturer's serial number or a communication system address, that enables messages to be specifically communicated to that vehicle.

The vehicle controller 21 stores sensed data regarding the vehicle operation in the controller memory 24. In addition, the stored data can include information produced by vehicle controller 21, such as the number of hours in operation, battery state of charge, and operational fault codes. Load lifting operations are monitored by deriving the amount of time that the lift motor 51 is active. Various speed parameters, such as speed and acceleration of the vehicle also are monitored on the exemplary industrial vehicle.

The vehicle controller 21 furnishes some of that data to the operator indicators 12 that display vehicle operating parameters, such as for example, the speed of travel, battery charge level, hours of operation, time of day, and that maintenance is needed. Temperature sensors monitor the temperature of the motors and other components and that data can be displayed. Alert indications also are presented on the operator indicators to notify the operator of vehicle conditions requiring attention.

The guidance and navigation system (GANS) 13 also is coupled to the vehicle controller 21 to provide control signals for operating the lift motor control 23, the traction motor control 27 and the steer motor control 29 to guide the vehicle in the unmanned, autonomous mode of operation. The GANS 13 has an operator input device 61 and an operator display 66. The GANS 13 is coupled through a connector 72 to a second communication network 70, such as another CAN serial bus that leads to an interface circuit 74. The interface circuit 74 is connected to the first communication network 26, thereby enabling messages with commands and data to be exchanged with the vehicle controller 21, as will be described. The interface circuit 74 provides isolation between the first and second communication networks 26 and 70 thereby preventing inappropriate signals applied to the connector 72 from adversely affecting the transfer of messages over the first communication network.

Figure 3:
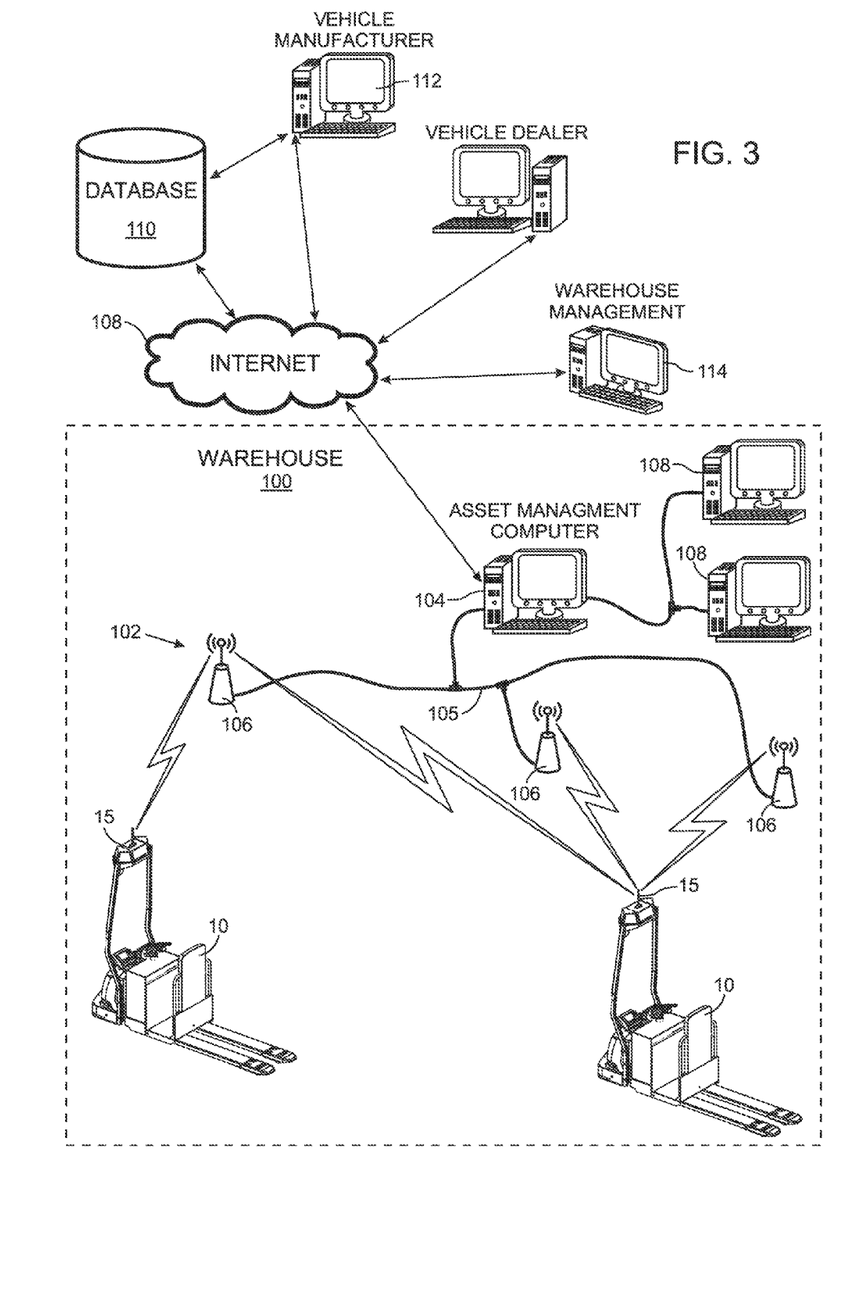
FIG. 3 depicts an vehicle fleet management system in which industrial vehicles communicate via a wireless network with a central asset management computer that is linked to a remote database to which other distant computers have access.

Referring to FIG. 3, a warehouse 100, in which one or more industrial vehicles 10 operate, has a bidirectional communication system 102 that links the wireless communicator 67 in each of the industrial vehicles 10 to an asset management computer 104 at a fixed location in the facility. The communication system 102 comprises a plurality of wireless access points 106 distributed throughout the warehouse 100, such as in the shipping dock and goods storage areas. The wireless access points 106 are radio frequency signal transceivers that are connected via a conventional hard-wired local area network 105 or a TCP/IP communications link to the asset management computer 104. Alternatively the wireless access points 106 can be wirelessly coupled, such as through a Wi-Fi link, to the asset management computer 104.

The communication system 102 also can provide a mechanism by which the location of each industrial vehicle 10 within the warehouse is determined. Periodically, the transceiver at each wireless access point 106 broadcasts a location message that is received by all the industrial vehicles 10. The location message carries an identification of the transmitting wireless access point 106 and a time code, e.g., the time of day, designating the moment that the message was sent. Each industrial vehicle 10 has a clock that produces a similar time code. All the time code generators in the wireless access points 106 and on the industrial vehicles 10 are synchronized. Upon receiving a location message, the industrial vehicle records the time code from its clock. The vehicle controller 21 employs the transmit and receive time codes to calculate the propagation time of the location message from the respective wireless access point 106 to that industrial vehicle 10. The propagation time directly corresponds to the distance that the industrial vehicle is from the respective wireless access point. The vehicle controller 21 uses the wireless access point identification carried by the location message, to access a table stored in the controller memory 24 and determine the fixed position of that wireless access point. By knowing the message propagation times and positions of at least three access points 106, the vehicle controller 21 is able to use triangulation to determine the vehicle's location within the warehouse 100. This function of the wireless access points 106 is referred to as a Local Positioning System (LPS). Other means for determining vehicle location can be employed. For example, the GANS 13 may periodically determine the vehicle location and provide an designation of that location to the vehicle controller 21.

The asset management computer 104 also communicates via the Internet 108 or other communication link with warehouse management computer system 114 at the headquarters of the warehouse company. That connection enables the management computer system 114 to receive data regarding the operation of the fleet of industrial vehicle at all the warehouses in the company. Both asset management computer 104 and the warehouse management computer system 114 execute software for storing, analyzing and reporting the operating information pertaining to the industrial vehicles.

The connection of the asset management computer 104 to the Internet 108, or other external communication link, enables the asset management computer 104 to access a database 110 that contains data provided from a computer 112 at the manufacturer of the vehicles. The data gathered from the industrial vehicles at the warehouses also is uploaded and stored in the database 110. Selected data may be accessed by, for example, warehouse management personnel or vehicle dealers, who connect to the database 110 through the Internet 108. The various computers can analyze and compare the data gathered from all the industrial vehicles at a given warehouse, at all facilities of the warehouse company, or all the vehicles made by the manufacturer.

INDUSTRIAL APPLICABILITY

The present industrial vehicle 10 can be operated in either a manned, manual mode in which an on-board human operator controls the vehicle's functions; in an unmanned, autonomous (robotic) mode in which the GANS 13 automatically controls the vehicle operation without requiring the presence of a human operator; or in a remote control mode in which a person at the asset management computer 104 sends commands to operate the vehicle.

Figure 4:
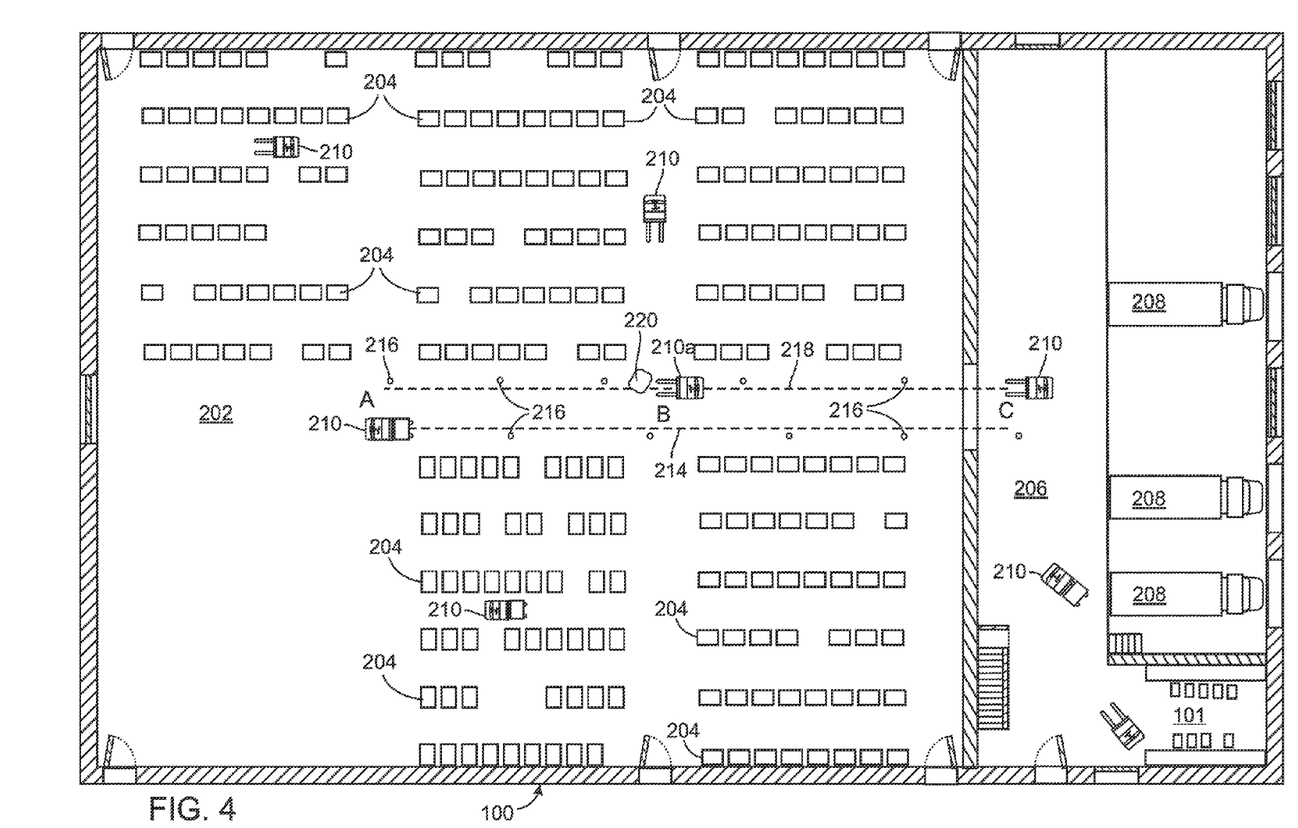
FIG. 4 is a floor plan of a warehouse in which the industrial vehicles operate.

With reference to FIG. 4, the warehouse 100 comprises a storage area 202, where a plurality of pallets 204 of goods are stored, and a loading dock area 206 for transferring the goods off and on delivery trucks 208. The warehouse also has an area for the battery recharging station 101. A given warehouse may have several battery recharging stations at different locations.

A plurality of industrial vehicles 10 travel around the warehouse 100 unloading delivery trucks 208, placing the goods on the pallets 204, and subsequently removing the goods from a storage area and loading them onto other delivery trucks. For example, a first operator manually drives a hybrid manned-autonomous industrial vehicle 10 through the storage area 202 to the appropriate location at which the desired goods are stored and those goods are loaded onto the load carrier 18 of the vehicle. Then the industrial vehicle 10 is driven to a staging area at station A, where the first operator employs the operator input device 61 to place the industrial vehicle 10 in the autonomous mode with instruction to travel along path 214 to station C. The first operator then steps off the industrial vehicle 10, which action is indicated to the vehicle controller 21 by a signal from a pressure sensitive floor mat in the operator compartment 11 (see FIG. 1). Thereafter, the industrial vehicle 10 commences autonomous operation traveling along the path 214 past station B to the destination at station C. Note that the industrial vehicle also can be manually driven to station B from which it is sent in the autonomous mode to station C when carrying goods from a storage location that is closer to station B.

As an alternative to an operator manually entering the path assignment into the operator input device 61, a central dispatcher can enter the path assignment into the asset management computer 104 from which the path assignment is transmitted via the warehouse communication system 102 to the industrial vehicle 10. The vehicle controller 21 then sends the path assignment through the first communication network 26, the interface circuit 74, and the second communication network 70 to the guidance and navigation system (GANS) 13.

Upon receiving a path assignment, the GANS 13 then assumes control over the operation of the industrial vehicle 10. That control comprises the GANS 13 sending commands to the vehicle controller 21 that mimic the digital data generated by the manual operator controls 17, such as the control handle 14. Thus, the vehicle controller 21 receives commands from the GANS 13 that indicate the speed and direction at which the traction motor 43 should be driven, and the direction and degree to which the steer motor 47 should turn the steerable wheel 49 in order to propel the vehicle along the assigned path. That control by the GANS 13 also involves sending commands to the vehicle controller 21 when the brake 22 is to be applied or released.

As the industrial vehicle 10 travels in the autonomous mode, sensors on the GANS 13 detect the position of the vehicle relative to the assigned path 214. In one type of GANS, a camera 76 or a laser scanner detects fiducials 216 that are placed periodically along various paths in the warehouse. The fiducials 216 may be placed on the warehouse floor, walls, pillars, shelves and other objects having a fixed location. Each fiducial 216 has a unique appearance or optically readable code, e.g. a unique barcode or other optical pattern, thereby enabling the GANS 13 to determine the present position of the vehicle and the direction to take to reach the next fiducial 216 along the assigned path 214. Another type of GANS 13 employs a video camera 76 that produces images of the environment adjacent the industrial vehicle 10. Those images are processed by image recognition software that identifies physical features of the warehouse and from those physical features determine the present location of the industrial vehicle 10. Either type of GANS 13 uses the derived data to ascertain when and how to turn the steerable wheel 49 so that the industrial vehicle 10 travels along the assigned path 214.

When the GANS 13 detects arrival at station C, the industrial vehicle 10 automatically stops and awaits for further operating commands. Eventually a second operator steps onboard and places the industrial vehicle 10 into manual mode. This operator then manually drives the industrial vehicle onto one of the delivery trucks 208 parked at the loading dock area 206 and deposits the goods in that truck. The second operator then returns the industrial vehicle 10 to station C and points the vehicle toward station A.

Then, the second operator enters commands into the operator input device 61 to indicate path 218 for the vehicle to travel to station A and initiates the autonomous mode. After the second operator exits the compartment 11, the industrial vehicle 10 commences traveling along path 218 to station A. Upon arriving at station A, the industrial vehicle stops and waits for another operator to control the vehicle manually.

There are certain incidents which incapacitate an industrial vehicle 10 operating in the autonomous mode. For example, such vehicles typically have one of more emergency shutoff switches that a person on the floor of the warehouse can operate if undesired vehicle operation is observed. The autonomously operating vehicle also is programmed to stop operating when an onboard sensor 60 detects impacting an object with greater than a predetermined amount of force.

Another incident is depicted in FIG. 4, where autonomous industrial vehicle 210 encountered an obstacle 220 in its path. The guidance and navigation system 13 sensed that obstacle and stopped the vehicle before a collision occurs. The guidance and navigation system, however, cannot determine how to maneuver around the obstacle 220, thus the industrial vehicle 210 remains stationary at that location. All of these incidents result in an "unplanned stoppage" of the vehicle, because that stoppage is not part of path assignment given to the vehicle.

If the unplanned stoppage is not rectified, such as by the obstacle 220 being removed, within a predefined period of time, the vehicle controller 21 automatically commences a recovery procedure.

In order to implement the recovery procedure, each industrial vehicle 10 continuously gathers location and image data while operating. As noted previously, the GANS 13 may detect unique fiducials 216 attached to fixed objects at known positions in the warehouse 100. The memory in the GANS contains a table that relates the unique appearance or code of each fiducial 216 to the associated warehouse position. Therefore, upon detecting a particular fiducial 216, which is a given occasion, the GANS 13 knows that is at the location in the warehouse 100 where that fiducial is positioned. Alternatively the GANS 13 may periodically determine the present vehicle location by processing video or still images from the camera 76. In another technique, the present vehicle location is derived by the local positioning system using signals from several wireless access points 106 in the warehouse. Regardless of the particular technique that is employed, each location determined for the vehicle is referred to as an "identified location". The GANS 13 signals the vehicle controller 21 each time a new identified location is derived. The vehicle controller 21 responds by resetting the odometer 46 to begin measuring the distance that the industrial vehicle 10 travels from the new identified location. Thus the odometer is reset whenever a new identified location is derived.

If instead of using fiducials 216 for guidance, the GANS 13 may apply image processing to a video signal produced by camera 76 to detect features of the warehouse structure to guide the vehicle along the assigned path. In this case, the GANS 13 detects when the vehicle reaches each of the stations A, B and C, which then become identified locations of the vehicle. Arriving at or passing through one of those identified locations, which is a given occasion, causes the vehicle controller 21 to reset the odometer 46 to begin measuring the distance that the industrial vehicle 10 travels from the associated station which has a known location in the warehouse.

The camera 76 in the GANS 13 continuously produces a sequence of video images while the industrial vehicle 10 is operating. The video image data comprising a sequence of a plurality of the video images for a given period of time, for example 15 to 20 seconds, are stored in a file in a memory 77 of the GANS 13. Storing data in that file is configured so that a new video image writes over the oldest video image and thereby the memory file contains the most recent 15 to 20 seconds of the video data. Instead of a video camera, a still image camera can be used which periodically, for example every one-half second, produces a single image of the environment adjacent to the industrial vehicle 10. Those still images are stored in a looping manner in the file of the GANS memory 77. The memory 77 in the GANS 13 may be any type of conventional data storage device, such as a computer hard drive, for example.

When an industrial vehicle 10 or 210 makes the unplanned stoppage, such as upon encountering the obstacle 220 in its path (an incident), the GANS 13 closes the image file in which the camera images previously had been stored and opens a new file for storing future images in another 15-20 second loop. Thus the plurality of images acquired immediately prior to the unplanned stoppage incident are retained in the first of those files. Next, the vehicle controller 21 generates an incident message that contains an indication of the type of incident that caused the unplanned stoppage, the last identified location, the current odometer reading indicating a distance, and the direction of travel from the last identified location. The incident message also contains the file of the video or still images stored in the GANS memory 77 immediately prior to the unplanned stoppage. The incident message then is transmitted from the wireless communicator 67 to the communication system 102 through which the message is conveyed to the asset management computer 104.

Upon receiving an incident message, the asset management computer 104 extracts the non-image data which is used to display an incident notification on the monitor of that computer. The non-image data also may be sent to designated personnel at the warehouse, such as supervisors and incident responders. The asset management computer 104 is configured with a list of email addresses for designated people who are to be notified about each unplanned stoppage. Alternatively, the configuration data can specify separate groups of people who are to be notified for each different type of unplanned stoppage, e.g., an obstacle, emergency shutoff switch activation, or an impact. Those designated people receive the email via a smart phone or other computers 108 in the warehouse that are connected to the asset management computer 104. Upon receiving the email, a person uses the last identified location, the odometer distance, and the direction of travel to go to the vehicle to address the cause of the unplanned stoppage. Alternatively, the email recipient can access the images contained in the incident message to determine the cause of the unplanned stoppage.

In a variation of the recovery procedure, the incident message sent from the industrial vehicle does not contain image data, and contains only an indication of the type of incident, the last identified location, the odometer distance, and the direction of travel from the last identified location. In this case, upon being notified of the unplanned stoppage, a person, if desired, can send an image request message from the asset management computer 104 via the communication system 102 to the respective industrial vehicle 210a. The vehicle controller 21 in that vehicle replies to the image request message by gathering the image data from the GANS memory 77 and placing that data into an image message which is transmitted back to the asset management computer 104 for viewing by the requesting person. A variant of this recovery procedure is used when the GANS memory 77 stores a plurality of image data files acquired in response to different unplanned stoppages, wherein each file can be accessed to evaluate the respective incident evaluation. Now upon occurrence of a new unplanned stoppage the incident message also contains a designation of the specific image data file in the GANS memory 77 that contains the images for the new unplanned stoppage. That image file designation then is used in the image request message to have the proper file retrieved from the GANS memory 77 and the images therein transmitted to the asset management computer 104.

In another implementation, a person is able to control operation of the industrial vehicle 10 or 210 from the asset management computer 104 to rectify the incident that caused the unplanned stoppage. Initially the person enters a command that causes the industrial vehicle to transition from the autonomous mode to the remote control mode. In the remote control mode, current images are sent from the industrial vehicle 10 or 210 to the asset management computer 104 which displays the images. The person is able to send commands from the asset management computer 104 to the industrial vehicle to control the steering, direction of travel, speed and other functions. For example, the industrial vehicle 210 can be commanded to travel around the obstacle 220 that is blocking the assigned path. When the incident has been rectified and remote control no longer is required, operation of the vehicle's control system 20 is restored to the autonomous mode by another command sent from the asset management computer 104.

Alternatively, supervisory personnel at the asset management computer 104 can send instructions to the industrial vehicle 210 to reprogram the GANS 13 with another path to the desired destination, thereby avoiding the obstacle.

In a like manner, when an impact of the vehicle causes the unplanned stoppage and transmission of an incident message to the asset management computer 104, the image data in that message can be viewed at that computer. This enables supervisory personnel to observe the environment of the industrial vehicle 10 and learn the nature and severity of the impact that occurred. Thus the supervisory personnel can determine whether the industrial vehicle is operable, in which case appropriate commands are sent from the asset management computer 104 to the industrial vehicle instructing appropriate vehicle operation. Alternatively in the case of a significant impact, the supervisory personnel can dispatch a repair technician to attend to the industrial vehicle.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. For example, although the present concepts were described in the context of use on a hybrid manned-autonomous vehicle, they can be employed on an entirely autonomous guided vehicle. Accordingly, the scope of the invention should be determined from the following claims and not limited by the above disclosure.

The invention claimed is:

1. A method for operating an autonomously guided industrial vehicle that travels through a facility, said method comprising:
   using a camera to acquire images of the facility as the autonomously guided industrial vehicle travels;
   storing each acquired image onboard the autonomously guided industrial vehicle;
   the autonomously guided industrial vehicle encountering a predefined incident;
   in response to the autonomously guided industrial vehicle encountering the predefined incident, wirelessly transmitting an incident message from the autonomously guided industrial vehicle to a remote management computer, wherein the incident message contains location data indicating a location of the autonomously guided industrial vehicle;
   determining the predefined incident is resolved;
   in response to determining the predefined incident is resolved, transferring from the autonomously guided industrial vehicle a plurality of the images acquired prior to the predefined incident; and
   the remote management computer responding to the incident message by providing a human perceivable notification about the incident.

2. The method as recited in claim 1 wherein the plurality of the images comprises a video sequence.

3. The method as recited in claim 1 wherein the incident message contains an indication of a type of incident that occurred.

4. The method as recited in claim 1 wherein the incident message contains at least one of the plurality of the images.

5. The method as recited in claim 1 wherein the plurality of the images is transferred as part of the incident message.

6. The method as recited in claim 1 further comprising:
   determining an identified location at which the autonomously guided industrial vehicle is located; and
   measuring a distance that the autonomously guided industrial vehicle travels from the identified location.

7. The method as recited in claim 6 wherein the location data comprises an indication of the identified location and an indication of the distance.

8. The method as recited in claim 6 wherein an identified location is determined in response to determining a given occasion occurs as the autonomously guided industrial vehicle travels, and the measuring measures a distance that the autonomously guided industrial vehicle travels from each identified location.

9. The method as recited in claim 1 wherein providing a human perceivable notification comprises sending an email.

10. The method as recited in claim 1 further comprising:
  determining the remote management computer receives the incident message;
  in response to determining the remote management computer receives the incident message, wirelessly transmitting an image request message to the autonomously guided industrial vehicle; and
  the autonomously guided industrial vehicle responding by transferring the plurality of the images from the autonomously guided industrial vehicle in a wireless transmission.

11. The method as recited in claim 1 wherein the plurality of images is stored in one of a plurality of image files onboard the autonomously guided industrial vehicle; and the incident message contains a designation of the one of the plurality of image files that contains images acquired prior to the predefined incident that caused transmission of that incident message.

12. A method for operating an autonomously guided industrial vehicle that travels through a facility between points of planned stoppages, said method comprising:
  occasionally determining a present location of the autonomously guided industrial vehicle, thereby producing an identified location;
  a camera onboard the autonomously guided industrial vehicle producing images of an adjacent environment;
  storing a plurality of the images onboard the autonomously guided industrial vehicle;
  determining an unplanned stoppage of the autonomously guided industrial vehicle has occurred;
  in response to the unplanned stoppage of the autonomously guided industrial vehicle, automatically transmitting an incident message from the autonomously guided industrial vehicle to a remote management computer, wherein the incident message contains a first indication of an incident that caused the unplanned stoppage, a second indication of the identified location, and the plurality of the images; and
  the remote management computer responding to the unplanned stoppage of the autonomously guided industrial vehicle by providing a notification about the incident.

13. The method as recited in claim 12 wherein storing a plurality of the images stores images acquired during a most recent defined period of time.

14. The method as recited in claim 12 wherein the plurality of the images comprises a video sequence.

15. The method as recited in claim 12 further comprising measuring a distance that the autonomously guided industrial vehicle travels from the identified location.

16. The method as recited in claim 15 wherein the incident message further contains an indication of the distance.

17. The method as recited in claim 12 further comprising the remote management computer responding to the incident message by providing a notification about the incident to a person.

18. The method as recited in claim 12 further comprising the remote management computer responding to the incident message by sending an email about the incident to a person.

* * * * *